United States Patent [19]
Landgraf

[11] 4,103,213
[45] Jul. 25, 1978

[54] TWO SPEED SINGLE PHASE INDUCTION MOTOR

[75] Inventor: Robert A. Landgraf, Ferguson, Mo.

[73] Assignee: Emerson Electric Co., St. Louis, Mo.

[21] Appl. No.: 723,989

[22] Filed: Sep. 16, 1976

[51] Int. Cl.² ............................................ H02K 17/08
[52] U.S. Cl. .................................. 318/224 A; 310/184
[58] Field of Search ............... 318/224 A, 224 R, 138, 318/254, 220 B; 310/184, 180, 198

[56] References Cited

U.S. PATENT DOCUMENTS

| | | | |
|---|---|---|---|
| 3,153,184 | 10/1964 | Stout | 318/224 A |
| 3,359,476 | 12/1967 | Charlton | 318/224 A |
| 3,887,854 | 6/1975 | Parks | 318/224 A |

*Primary Examiner*—Herman J. Hohauser
*Attorney, Agent, or Firm*—Polster, Polster and Lucchesi

[57] ABSTRACT

A dynamoelectric machine in the form of an induction motor is provided which is capable of two speed operation with a minimum number of motor leads and a minimum number of motor windings. The motor includes a stator assembly and a rotor assembly, the stator assembly being adapted to receive the motor windings in a conventional manner. The motor windings are constructed from a plurality of coil sets, groups of which define physical poles for the motor. The windings include a first main winding, a second main winding and an auxiliary winding. The first main winding and the auxiliary winding have an equal number of physical motor poles. The second main winding has twice the number of physical motor poles as the first main winding. The first main winding and the auxiliary winding are energized to permit motor operation at a first speed. Second speed operation is obtained by energizing the second main winding, disconnecting the auxiliary winding, and reconnecting the first main winding so that it functions as an auxiliary winding for the second main winding.

10 Claims, 5 Drawing Figures

TWO SPEED SINGLE PHASE INDUCTION MOTOR

BACKGROUND OF THE INVENTION

This invention relates to dynamoelectric machines, and in particular, to single phase induction motors. While the invention is described with particular reference to motors used in hermetic compressor applications, those skilled in the art will recognize the wider applicability of the inventive principles disclosed hereinafter.

There long has been a need in the residential refrigeration market for efficient and economical equipment. The rising cost of energy, in all forms, has tended to accent this need. One area where improved efficiency can be obtained is in the sizing of the equipment itself so that efficient operation is attained over a wide range of load conditions. In the past, it has been difficult to size the equipment so that the equipment, as installed, has ample capacity for peak load conditions, yet also operates efficiently and provides comfort at lighter load conditions. Prior art solutions to the sizing problems usually involved various mechanical unloading devices in order to regulate the load to the system. The terms refrigeration and air conditioning are used interchangeably in this specification in their broadest generic sense, and are intended to include any system having a hermetic compressor as an element.

More recently, attempts have been made to modulate the compressor of the refrigeration system by operating the compressor at two distinct speeds. One example of a motor useful in this modulation effort is shown and described in the copending application by Spradling, No. 723,990, filed Sept. 16, 1976, and assigned to the assignee of the present invention.

Multi-speed motors are well known in the art. In the past, multi-speed motors conventionally have been constructed by placing a plurality of distinct windings within a stator core, and thereafter switching between sets of distinct windings to vary motor speed. For the purposes of this specification, the term "distinct windings" means that each main winding pole of a dynamoelectric machine has a corresponding auxiliary winding pole used only in conjunction with its own main winding pole. With this type of motor construction, the number of main winding poles conventionally equals the number of auxiliary winding poles, the poles of the main and auxiliary winding being physically displaced with respect to one another in order to generate the revolving field of the induction device. While these multi-speed motors work well for their intended purposes, they generally have been used in applications where slot fills of the motors are not critical. "Slot fill" is a term of art, and generally refers to the slot area displaced by the turns of the motor winding divided by the total usable slot area, expressed as a percentage. In many induction motor applications, slot fills are not critical, and ample slot space is provided in the lamination design for carrying a number of motor windings in the slots of the stator assembly.

Hermetic motors, on the other hand, usually have slot fill concentrations that preclude multiple independent winding use. The high slot fills become necessary in order to achieve efficient motor operation in the first place. In general, motor performance can be improved by increasing the amount of material used in the windings or the stator core stack. Both of these design expedients are practiced extensively in hermetic motor design.

An additional factor involved in motor design for hermetic motors is the fact that the hermetic motor is enclosed and hermetically sealed within the compressor unit of the refrigeration system. Electrical connections are made through the shell of the compressor. The shell has a connection opening made in it, and a special connector that preserves the integrity of the refrigerant system is inserted in and hermetically seals the opening. The use and insertion of the connectors in the shells adds significantly to the compressor cost. Consequently, a general design requirement is that motors utilized in hermetic compressors use a minimum number of leads to minimize construction problems and the extra cost inherent in making multiple openings through the compressor shell to accommodate the electrical connectors.

The motor design disclosed hereinafter meets these stringent design criteria by providing a multiple speed motor having a minimum number of motor leads, which exhibits comparable performance at rated loads on either speed. In the preferred embodiment, the stator assembly of the motor has two independent main windings constructed from a plurality of coil sets inserted in the slots of the stator. The coil sets of the first main winding define two physical motor poles, while the coil sets of the second main winding define four physical motor poles. An auxiliary winding is provided, also constructed from a plurality of coil sets. The coil sets of the auxiliary winding define two physical poles, and the auxiliary winding is rotated physically with respect to the first main winding. When two pole motor operation is desired, the first main winding and the auxiliary winding are energized and the motor operates in a conventional manner as a two pole induction motor. When four pole operation is desired, the second main winding is energized, and the coil sets of the first main winding are reconnected so that the polarities of the two physical motor poles produce four electrical motor poles, the first main winding functioning as a second auxiliary winding for the second main winding of the motor.

Those skilled in the art will recognize that interconnection and energization of the windings may be accomplished automatically by suitable switching means. The arrangement disclosed utilizes a minimum number of windings, and requires only five external leads for passage through the compressor shell.

One of the objects of this invention is to provide a multi-speed induction motor having a first main winding, a second main winding, and a single distinct auxiliary winding, one of the main windings being reconnected to form a second auxiliary winding for the second main winding of the motor when the second speed operation is desired.

Another object of this invention is to provide a two speed hermetic motor for utilization in refrigeration compressors.

Yet another object of this invention is to provide a multi-speed hermetic motor having a minimum number of winding leads.

Another object of this invention is to provide a multi-speed motor where the breakdown torque of the motor, which is dependent upon the main winding, may be independently adjusted for each speed by adjusting each main winding.

Still another object of this invention is to provide an induction motor providing more efficient operation of a refrigeration system.

Other objects of this invention will be apparent to those skilled in the art in light of the following description and accompanying drawings.

SUMMARY OF THE INVENTION

In accordance with this invention, generally stated, an induction motor is provided having multi-speed capabilities, with a minimum winding arrangement. The motor includes a first independent main winding having a first number of physical motor poles, a second independent main winding having twice the number of physical motor poles as the first main winding, and an auxiliary winding having the same number of physical motor poles as the first main winding. The auxiliary winding and the first main winding are electrically energized to operate the motor at a first speed. A second motor speed is obtained by connecting the first main winding so that the polarities of the two physical motor poles produce four electrical motor poles, the first main winding forming a second auxiliary winding for the motor, and energizing the second main winding simultaneously with the reconnection and energization of the newly defined second auxiliary winding.

DESCRIPTION OF THE PREFERRED EMBODIMENT

Figure 1:
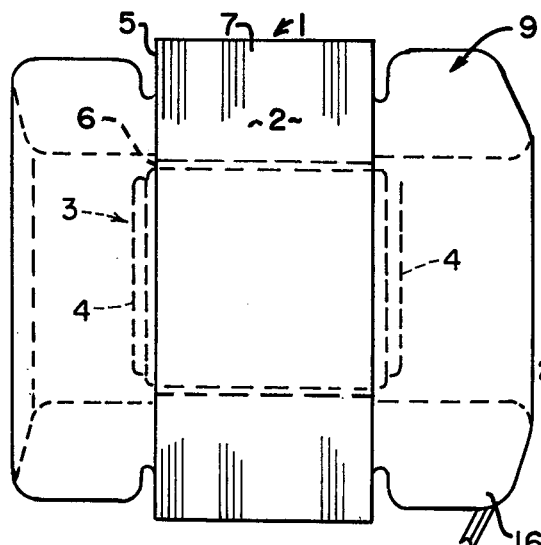
FIG. 1 is a view in side elevation of one illustrative embodiment of a dynamoelectric machine employing my invention.

Referring now to FIG. 1, reference numeral 1 indicates an induction motor which may be of a variety of motor types suited for a variety of applications. The particular motor 1 shown is a hermetic motor, which, as will be appreciated by those skilled in the art, comprises a stator assembly 2 and a rotor assembly 3. A hermetic motor conventionally is supplied to original hermetic compressor manufacturers as "motor parts", in that the stator and rotor assemblies are supplied independently of one another for insertion and interconnection in the compressor. Other motor types normally are manufactured as a unit within a self-contained enclosure and require only the application of electrical energy for operation.

The rotor assembly 3 generally comprises a plurality of stacked laminations constructed from suitable magnetic material. Individual laminations conventionally have a central opening through them, which defines an opening through the rotor assembly 3 for receiving a shaft, not shown. The shaft for hermetic motors commonly is provided by the compressor manufacturer, and the rotor assembly 3 is fitted to the shaft during compressor construction. The rotor 3 preferably is a squirrel cage design, and the laminations of the rotor assembly 3 have a plurality of rotor slots formed in them. The rotor slots receive the cast rotor bars of the squirrel cage. The rotor bars are terminated along the outboard faces of the lamination stack along end rings 4 in a conventional manner. The rotor assembly 3 as thus described is conventional and does not form a part of the invention described hereinafter.

The stator assembly 2 also is constructed from a plurality of individual laminations 5. Each of the laminations 5 has a central opening through it, which defines a bore 6 when the laminations are arranged in stacked relationship in a stator core 7. The laminations are fixed in stacked relationship by any convenient method. Welding, cleating and epoxy bond, singly or in combination, are common expedients used in core 7 construction. The bore 6 is sized to receive the rotor assembly 3 and to provide a predetermined air gap between the inner diameter of the stator core 7 and the outer diameter of the rotor assembly 3.

Figure 2:
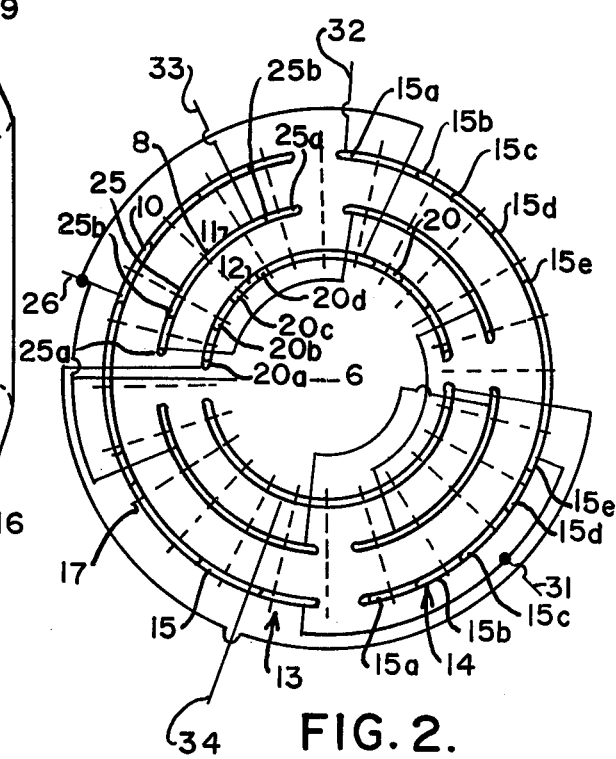
FIG. 2 is an illustrative connection diagram showing coil placement for one illustrative winding of this invention.

The stator core 7 also has a plurality of receptacles, not shown, which conventionally extend radially outwardly from the bore 6 and communicate with the bore along one end of the receptacles. When aligned in the core 7, the receptacles define a plurality of winding receiving slots 8, successive slots being separated by a stator tooth 17. The slots 8 and teeth 17 are illustrated diagrammatically in FIG. 2. The particular lamination design represented in FIG. 2 has twenty-four of the slots 8 associated with it. Those skilled in the art will recognize that lamination design, slot size, and slot number, for example, may vary in other embodiments of this invention. The slots 8 receive a motor winding 9 in a conventional manner. The winding 9, in the example shown in the drawings, includes a first main winding 10, a second main winding 11, and an auxiliary winding 12.

The winding 10 is intended for two pole operation, and normally has two physical winding poles, respective poles being delineated by a first winding part 13 and a second winding part 14. The winding parts 13 and 14 each are constructed from a plurality of coil sets 15, diagrammatically illustrated in FIG. 2. In the embodiment shown in FIG. 2, each of the winding parts 13 and 14 include five of the coil sets, indicated in FIG. 2 as sets 15a, 15b, 15c, 15d and 15e. The coil sets 15, in turn, are constructed from a plurality of individual wire turns. Each of the wire turns include a straight conductor run portion carried in the slots 8 of the stator core, and an end turn portion 16 which extends between the straight conductor run portions of a particular wire turn. The lamination 5 utilized in constructing the particular embodiment for the stator 2 shown in the drawings is a twenty-four slot lamination. The coil sets 15e, 15d, 15c, 15b and 15a of the winding parts 13 and 14 respectively span three, five, seven, nine and eleven of the teeth 17.

The auxiliary winding 12 also has two physical winding poles, respective poles being delimited by a winding part 18 and a winding part 19. Each of the winding parts 18 and 19 are constructed from a plurality of auxiliary coil sets 20. Each of the auxiliary winding parts 18 and 19 include four of the coil sets 20 indicated in FIG. 2 as sets 20a, 20b, 20c and 20d. The coil sets 20, in turn, also are constructed from a plurality of individual wire turns. The wire turns of the coil sets 20d, 20c, 20b and 20a are wound over five, seven, nine and eleven of the teeth 17. It may be observed, in FIG. 2, that the auxiliary winding 12 is physically rotated 90° with respect to the main winding 10. Consequently, the auxiliary winding 12 and main winding 10 may operate as a conventional two pole winding for the motor 1, giving the motor 1 a first operating speed.

The second main winding 11 has four physical winding poles, those poles being delimited by respective winding parts 21, 22, 23 and 24. Each of the winding parts 21 through 24 also are constructed from a plurality of second main winding coil sets 25. Each of the second main winding parts 21 through 24 include two of the coil sets 25, indicated in FIG. 2 as sets 25a and 25b. The coil sets 25, likewise, are constructed from a plurality of individual wire turns. The wire turns of the coil sets 25b and 25a are wound over three and five teeth 17.

Figure 3:
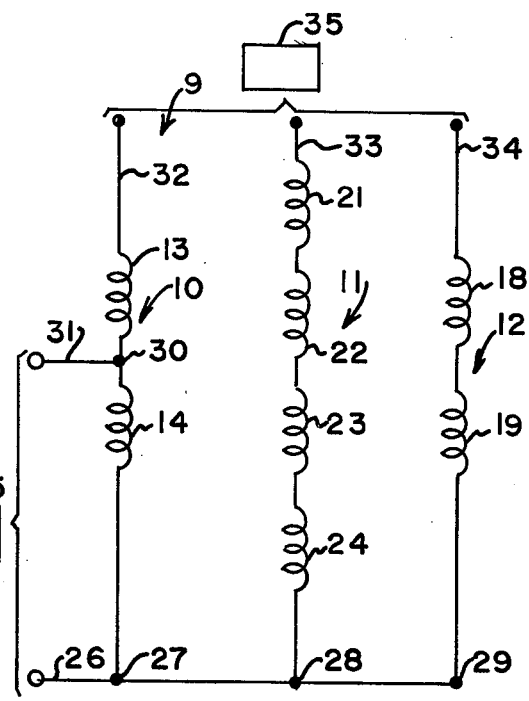
FIG. 3 is a circuit diagram for the winding shown in FIG. 2.

The various winding parts of the motor windings are connected to a source of electrical energy and other motor control devices through the use of motor leads. Thus, as is best observed in FIG. 3, a motor lead 26 is operatively connected to the winding part 14 at a connection point 27, to the winding part 24 at a connection point 28, and to the winding part 19 at a connection point 19. The winding part 14 is electrically connected between the connection point 27 and a connection point 30. A lead 31 is electrically connected to the connection point 30, as is one side of the winding part 13. The second side of the winding part 13 is electrically connected to a motor lead 32.

The winding parts 21, 22, 23 and 24 are serially connected to one another, between the connection point 28 and a motor lead 33.

The auxiliary winding parts 18 and 19 also are serially connected to one another between the connection point 29 and a motor lead 34 The motor leads 26, 31, 32, 33 and 34, 34. turn, are electrically connected to a suitable switch means 35.

The switch means 35 is conventional and may comprise any of a variety of commercially available devices. Consequently, it is not described in detail. As indicated above, the five motor leads for the stator assembly 2 are connected to a source of electrical energy through a compressor shell, in applications where the stator assembly 2 is adapted for hermetic motor use.

Figure 4:
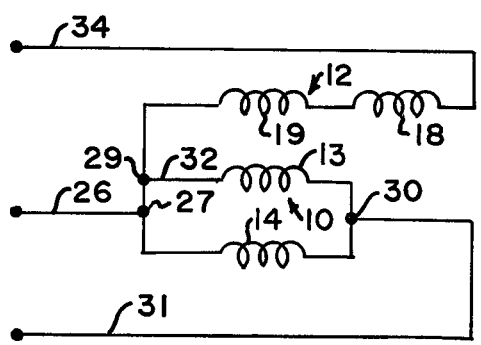
FIG. 4 is a simplified circuit diagram for the windings of FIG. 3, illustrating the interconnection for giving a first motor speed.

Operation of the motor of this invention is relatively simple to understand. The winding 9 is inserted in the stator assembly 2 and placed in a suitable application. The leads are connected to the switch means 35. Operation of the switch means 35 connects the winding 9 in the two configurations shown in FIGS. 4 and 5. In the position of the switch means 35 shown in FIG. 4, the main winding 10 has its winding parts 13 and 14 connected in parallel, and the auxiliary winding 12 is connected in series so that lead 26 becomes the common, the lead 31 becomes the main winding lead and the lead 34 becomes the auxiliary winding lead. In this configuration, the motor 1 functions as a conventional two pole induction motor, the lead 33 being open circuit.

Figure 5:
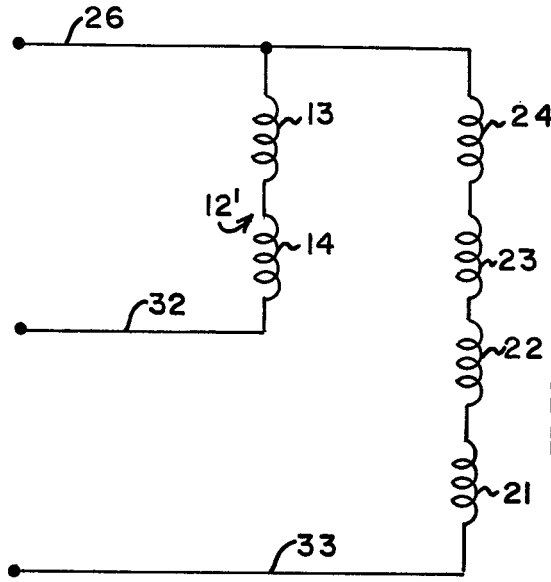
FIG. 5 is a simplified circuit diagram for the windings shown in FIG. 3, illustrating their interconnection for giving a second motor speed.

The second position of the switch means 35 is shown in FIG. 5. In this configuration, the winding parts 13 and 14 are connected in series so that the main winding 10 defines an auxiliary winding 12'. When so connected, the winding parts 13 and 14 have a polarity so that four electrical motor poles exist in the motor 1. The winding parts 21, 22, 23 and 24 are connected in series. The lead 26 remains the common lead, while lead 32 becomes the auxiliary lead and lead 33 becomes the main winding lead, the leads 31 and 34 being open circuit. It may be observed in FIG. 2 that the second main winding 11 is physically located with respect to the main winding 10 such that each physical and electrical pole of the main winding 11 has an associated electrical pole generated by the auxiliary winding 12' or main winding 10, located physically 45° from the poles of the main winding 11. Consequently, the main winding 11 and winding 10 connected as auxiliary winding 12' operate as a four pole winding for the motor 1, giving the motor a second speed characteristic.

Numerous variations, within the scope of the appended claims, will be apparent to those skilled in the art in light of the foregoing description and accompanying drawings. Thus, the lamination design, number of slots, tooth span and number of turns used for the respective windings all may vary in other embodiments of this invention. I have found that the following winding configuration gives adequate motor performance:

Winding 10: 15-33-33-32-32 turns of No. 16 ½ wire
Winding 12: 0-25-33-25-33 turns of No. 19 ½ wire
Winding 11: 26-27 turns of No. 16 ¾ wire These The physical location of the various winding parts may be changed in other embodiments of the invention. Thus, while various winding combinations were described as being rotated a number of physical or electrical degrees with respect to one another, rotations other than those described may be used, if desired. The variations are merely illustrative.

Having thus described the invention, what is claimed and desired to be secured by Letters Patent is:

1. A dynamoelectric machine, comprising:
 a rotor assembly;
 a stator assembly including a core constructed from a stack of individual laminations of magnetic material, said laminations having a central opening which defines a rotor receiving bore opening in the stacked relationship of the laminations, said laminations also having a plurality of closed bottom receptacles formed in them, said receptacles opening onto said bore and defining winding receiving slots in the stacked relationship of the laminations, and windings in said slots, said windings comprising:
 a first main winding having at least a first physical motor pole and a second physical motor pole;
 a second main winding having at least first, second, third and fourth physical motor poles;
 an auxiliary winding, said auxiliary winding having a first physical motor pole and a second physical motor pole, said auxiliary winding being physically displaced with respect to said first main winding; and
 means for operatively interconnecting selective ones of said first main winding, said auxiliary winding and said second main winding to give two-speed motor operation, said interconnecting means electrically connecting said first main winding and said auxiliary winding to provide a first motor speed capability, said interconnecting means connecting said first main winding and said second main winding so that said first main winding acts as an auxiliary winding for said second main winding to give a second motor speed capability, the polarity of said first main winding in said second speed capability condition being chosen so as to form two consequent physical poles producing four electrical motor poles.

2. The dynamoelectric machine of claim 1 wherein said stator core is constructed from a multiplicity of individual laminations, areas of said laminations between adjacent slots defining a plurality of stator teeth, said first main winding being constructed from a predetermined number of coil sets, respective ones of said coil sets spans wound successively over spans, of three, five, seven, nine and eleven teeth.

3. The dynamoelectric machine of claim 2 wherein said first auxiliary winding is constructed from a predetermined number of coil sets, respective ones of said coil sets spanning five, seven, nine and eleven teeth.

4. The dynamoelectric machine of claim 3 wherein said second main winding is constructed from a predetermined number of coil sets, individual ones of said coil sets spanning three and five of said teeth.

5. The dynamoelectric machine of claim 4 wherein the coil sets of said first main winding are connected in parallel in said first motor speed condition and are connected in series in said second motor speed condition.

6. An induction motor having multiple speed capabilities, comprising:
a stator assembly including a core of magnetic material having a central, rotor receiving opening and a plurality of winding receiving slots formed in it, and windings in said slots, said windings including:
a first main winding constructed from a plurality of coil sets, said coil sets defining at least a first physical motor pole and a second physical motor pole;
a second main winding including a plurality of coil sets defining at least first, second, third and fourth physical motor poles;
an auxiliary winding including a plurality of coil sets defining the same number of physical motor poles as said first main winding coil set plurality;
means for selectively interconnecting said first main winding and said auxiliary winding coil sets so as to define main and auxiliary windings respectively for said motor and for selectively interconnecting said first main winding and said second main winding so that said first main winding defines a second auxiliary winding for said second main winding; and
a rotor carried in said bore opening.

7. A dynamoelectric machine having a stator assembly including a first main winding defining a first number of physical motor poles, a second main winding defining a second number of physical motor poles, and an auxiliary winding defining the same number of physical motor poles as said first main winding, means for interconnecting said first main winding with said auxiliary winding, said dynamoelectric machine being adapted to operate at a first speed when said first main winding and said auxiliary winding are energized, means for selectively interconnecting said first main winding and said second main winding, the polarity of said first main winding being such as to induce twice the number of electrical motor poles as the number of physical motor poles of said first main winding so as to define a second auxiliary winding for said motor.

8. A method of providing a two speed motor having three winding sets and five leads for selectively interconnecting winding sets to a source of electrical energy, said motor including a rotor assembly and a stator assembly, comprising:
forming a first main winding having at least two physical motor poles;
forming an auxiliary winding having at least the same number of physical motor poles as said first main winding;
forming a second main winding having twice the number of physical motor poles as said first main winding; and
interconnecting said first main winding with said auxiliary winding to obtain a first rated motor speed, and interconnecting said first main winding with said second main winding to obtain a second rated motor speed, said first main winding in said second speed condition being connected so that the polarity of said windings is such that the number of electrical motor poles of said first main winding is equal to the number of physical motor poles of said second main winding.

9. The method of claim 8 wherein said first main winding is constructed from a plurality of coil sets, each of said coil sets being formed from a plurality of wire turns, including the step of adjusting the breakdown torque of the motor in said first rated speed condition by changing the number of wire turns in said first main winding.

10. The method of claim 9 wherein said second main winding is constructed from a plurality of second coil sets, each of said coil sets being formed from a plurality of wire turns, including the step of adjusting the breakdown torque of the motor in said second rated speed condition by changing the number of wire turns in said second main winding.

* * * * *

UNITED STATES PATENT AND TRADEMARK OFFICE
CERTIFICATE OF CORRECTION

PATENT NO. : 4,103,213
DATED : July 25, 1978
INVENTOR(S) : Robert A. Landgraf

It is certified that error appears in the above-identified patent and that said Letters Patent are hereby corrected as shown below:

Column 5, line 22, after "point" delete "19" and insert --- 29 ---.

Column 5, line 34, after "34," delete "34."

Column 6, line 19, after "wire" delete "These"

Column 6, line 25, after "desired" delete "The" and insert --- These ---

Column 7, line 3, after "sets" delete "spans" and insert --- being ---

Signed and Sealed this

First Day of May 1979

[SEAL]

Attest:

RUTH C. MASON
Attesting Officer

DONALD W. BANNER
Commissioner of Patents and Trademarks